US006846892B2

(12) United States Patent
Kindt-Larsen et al.

(10) Patent No.: US 6,846,892 B2
(45) Date of Patent: Jan. 25, 2005

(54) LOW POLYDISPERSITY POLY-HEMA COMPOSITIONS

(75) Inventors: Ture Kindt-Larsen, Holte (DK); Per Wolff, Birkerød (DK); Jens-Erik Sørensen, Hellerup (DK); Frederik Resen Steenstrup, Hellerup (DK); Hélène Rossignol, Copenhagen (DK); Frank F. Molock, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 23 days.

(21) Appl. No.: 10/367,253

(22) Filed: Feb. 14, 2003

(65) Prior Publication Data

US 2003/0236376 A1 Dec. 25, 2003

Related U.S. Application Data

(60) Provisional application No. 60/363,639, filed on Mar. 11, 2002.

(51) Int. Cl.$^7$ ............................................... C08F 118/00
(52) U.S. Cl. ..................... 526/320; 526/260; 526/264; 526/301; 526/303.1; 526/304; 526/307.5; 526/307.7; 526/314; 526/318.42; 526/328.5
(58) Field of Search ................................. 526/260, 264, 526/301, 303.1, 304, 307.5, 307.7, 314, 318.42, 320, 328.5

(56) References Cited

U.S. PATENT DOCUMENTS

| 3,854,982 A | 12/1974 | Aellon et al. |
| 3,916,033 A | 10/1975 | Merrill |
| 4,139,513 A | 2/1979 | Tanaka et al. |

(List continued on next page.)

FOREIGN PATENT DOCUMENTS

| EP | 0106641 A1 | 4/1984 | |
| EP | 0 184 761 | * 6/1986 | ........... C08F/20/00 |
| EP | 0238863 A2 | 9/1987 | |
| EP | 0823643 a1 | 2/1998 | |
| EP | 0951654 b1 | 10/1999 | |
| GB | 2257978 A | 1/1993 | |
| WO | WO 91/04283 A1 | 4/1991 | |
| WO | WO 00/17675 A1 | 3/2000 | |
| WO | WO 00/55653 A1 | 9/2000 | |
| WO | WO 03/003073 A1 | 1/2003 | |

OTHER PUBLICATIONS

Handbook of Polymer Liquid Interaction Parameters and Solubility Parameter, CRC Press, Inc. 1990 and Handbook of Solubility Parameters and Other Cohesion Parameters, A. F. M. Barton, CRC Press, 1985, Table 5.
Hansen Solubility Parameters; A User's Handbook, Charles M. Hansen, pp. 43–53, CRC Press 2000 and CMH's Sphere computer program for the calculations.
The Polymeric Materials Encyclopedia, Contact Lenses, Gas Permeable, Jay F. Kunzler, p 1–11.
Polymers And Resins, Brage Golding, Ph.D., Van Nostrand Company, pp. 457–463.

*Primary Examiner*—Helen L. Pezzuto
(74) *Attorney, Agent, or Firm*—Karen Harding

(57) ABSTRACT

The present invention relates to compositions comprising poly-HEMA having a peak molecular weight between about 25,000 and about 100,000, preferably between 25,000 and 80,000 and a polydispersity of less than about 2 to less than about 3.8 respectively and covalently bonded thereon, at least one cross-linkable functional group. The present invention further relates to low polydispersity poly-HEMA suitable for making the crosslinkable prepolymers, processes for functionalizing and purifying said poly-HEMA to form said crosslinkable prepolymers, viscous solutions made from said crosslinkable prepolymers, hydrogels made from said viscous solutions and articles made from said crosslinkable polymers, hydrogels and viscous solutions.

26 Claims, 1 Drawing Sheet

U.S. PATENT DOCUMENTS

| | | |
|---|---|---|
| 4,139,692 A | 2/1979 | Tanaka et al. |
| 4,235,985 A | 11/1980 | Tanaka et al. |
| 4,264,489 A | 4/1981 | Ibsen et al. |
| 4,323,636 A | 4/1982 | Chen |
| 4,430,417 A | 2/1984 | Heinz et al. |
| 4,495,313 A | 1/1985 | Larsen |
| 4,698,373 A | 10/1987 | Tateosian et al. |
| 4,711,943 A | 12/1987 | Harvey, III |
| 4,889,664 A | 12/1989 | Kindt-Larsen |
| 4,910,277 A | 3/1990 | Bambury et al. |
| 4,920,184 A | 4/1990 | Schafer et al. |
| 4,963,159 A | 10/1990 | Narducy et al. |
| 5,002,794 A | 3/1991 | Ratner et al. |
| 5,039,459 A | 8/1991 | Kindt-Larsen |
| 5,070,215 A | 12/1991 | Bambury et al. |
| 5,170,192 A | 12/1992 | Pettigrew et al. |
| 5,779,943 A | 7/1998 | Enns et al. |
| 5,849,810 A | 12/1998 | Muller |
| 5,849,841 A | 12/1998 | Muhlebach et al. |
| 5,998,498 A | 12/1999 | Vanderlaan et al. |
| 6,087,415 A | 7/2000 | Vanderlaan et al. |
| 6,380,314 B1 | 4/2002 | Soane et al. |
| 6,416,690 B1 | 7/2002 | Soane et al. |
| 6,419,858 B1 | 7/2002 | Houston et al. |
| 6,570,714 B2 | 5/2003 | Soane et al. |
| 6,709,103 B1 * | 3/2004 | Roffman et al. ............ 351/161 |
| 6,733,700 B2 | 5/2004 | Houston et al |

* cited by examiner .

_US 6,846,892 B2_

LOW POLYDISPERSITY POLY-HEMA COMPOSITIONS

RELATED APPLICATION INFORMATION

This patent application claims priority of a provisional application, U.S. Ser. No. 60/363,639 which was filed on Mar. 11, 2002.

FIELD OF THE INVENTION

This invention relates to poly-HEMA compositions having a specific molecular weight range and polydispersity. Methods for making contact lenses from said poly-HEMA and the contact lenses made thereof are also disclosed.

BACKGROUND OF THE INVENTION

Contact lenses have been used commercially to improve vision since the 1950s. Most current contact lenses are made of hydrogels formed by polymerizing hydrophilic monomers such as HEMA and vinylpyrrolidone in the presence of a minor amount of a crosslinking agent. The polymerization of the monomers results in shrinkage which may be as much as 20% by volume.

Prepolymers having backbones of PVA and reactive groups of acrylic groups have been disclosed. The reactive prepolymer is dissolved in water, and crosslinked inside a mold by irradiation with UV light to form a contact lens. The shrinkage during cure is small, but the hydrogels thus produced exhibits mechanical properties that may prove marginal for contact lens use.

U.S. Pat. Nos. 4,495,313, 4,889,664 and 5,039,459 disclose the formation of conventional hydrogels.

DESCRIPTION OF THE INVENTION

Figure 1:
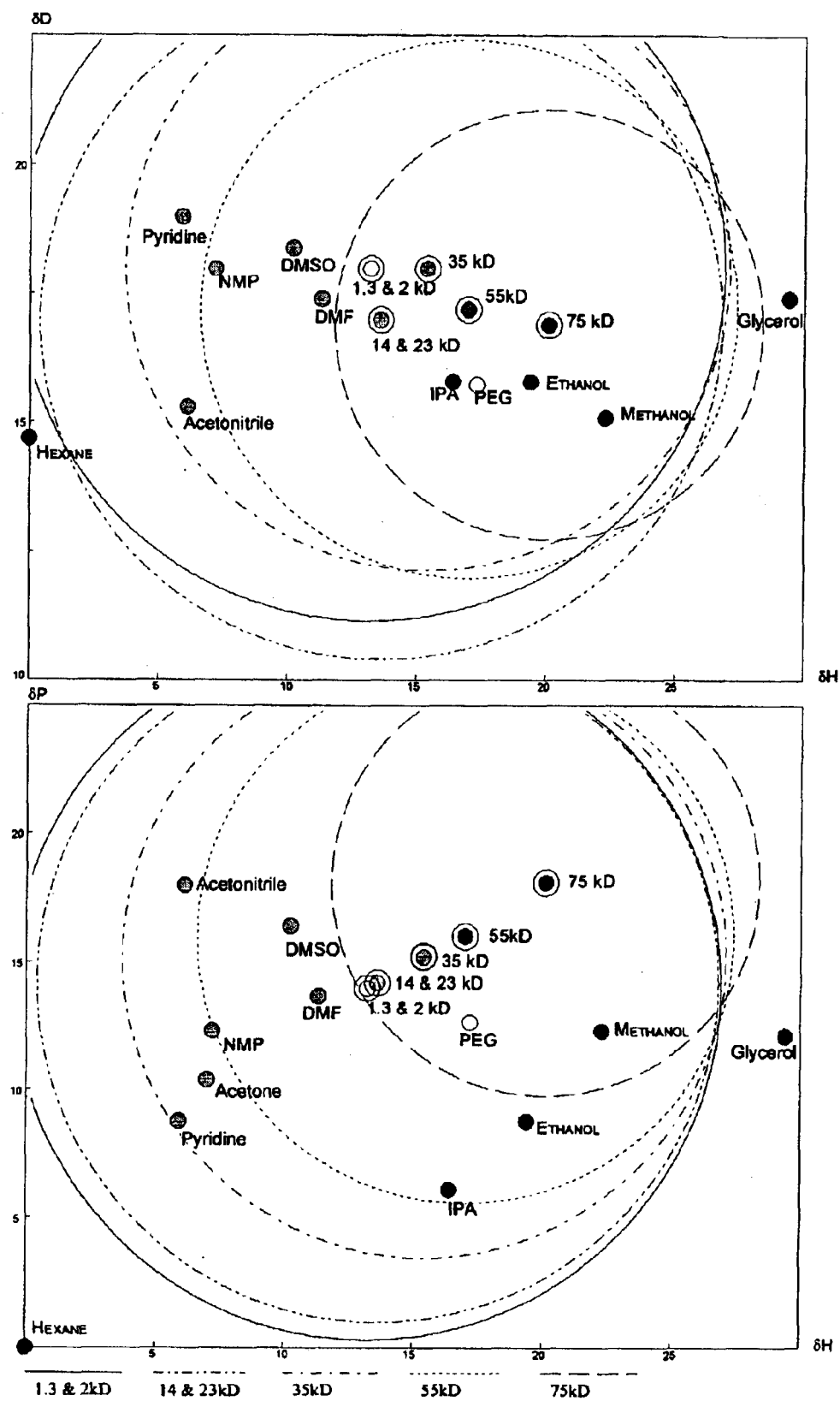
FIG. 1 shows Hansen Solubility Parameter spheres for the compositions made in the Examples.

The present invention relates to compositions comprising poly-HEMA having a peak molecular weight between about 25,000 and about 100,000, preferably between 25,000 and 80,000 and a polydispersity of less than about 2 to less than about 3.8 respectively and covalently bonded thereon, at least one cross-linkable functional group.

The present invention further relates to low polydispersity poly-HEMA suitable for making the crosslinkable prepolymers of the present invention, processes for functionalizing and purifying said poly-HEMA to form said crosslinkable prepolymers, viscous solutions made from said crosslinkable prepolymers, hydrogels made from said viscous solutions and articles made from said crosslinkable polymers, hydrogels and viscous solutions. Still further, the present invention relates to processes for making said viscous solutions, hydrogels and articles. Preferred articles include medical devices, and specifically contact lenses.

We have discovered that the undesirable shrinkage, expansion and related problems possessed by poly-HEMA hydrogels may be overcome by producing hydrogels from a crosslinkable prepolymer having a relatively low molecular weight and low polydispersity. We have also discovered that poly-HEMA having a relatively low molecular weight and low polydispersity can be prepared by new practical methods and have useful applications in themselves. In addition, the poly-HEMA of the present invention can be converted into crosslinkable prepolymers useful for making a number of articles, including hydrophilic coatings and contact lenses with improved mechanical properties. Finally the crosslinkable prepolymers of the present invention permit the production of high precision molded articles.

As used herein "poly-HEMA" means polymers which comprise 2-hydroxethyl methacrylate repeat units. The poly-HEMA of the present invention has a peak molecular weight in the range from about 25,000 with a polydispersity of less than about 2 to a peak molecular weight of about 100,000 with a polydispersity of less than about 3.8. Preferably, the compositions of the present invention have a peak molecular weight between about 30,000 with a polydispersity of less than about 2 and about 90,000 with a polydispersity of less than about 3.5. More preferably, the compositions of the present invention have a peak molecular weight between about 30,000 with a polydispersity of less than about 2 and about 80,000 with a polydispersity of less than about 3.2. Suitable poly-HEMA may also have a peak molecular weight below about 100,000 and a polydispersity of less than about 2, and preferably a peak molecular weight between about 45,000 and 100,000 and a polydispersity of less than about 2.5. In certain embodiments the polydispersity is less than about 2.5, preferably less than about 2, more preferably less than about 1.7 and in some embodiments is less than about 1.5. The term poly-HEMA as used above and throughout this specification will include polymers prepared from 2-hydroxethyl methacrylate alone as well as copolymers with other monomers or co-reactants as further described below.

The poly-HEMA of the present invention should be substantially free from branched polymer chains and gel particles. Gel particles are insoluble pieces of polymer believed to be polymer chains crosslinked by di- or multi-functional monomers. By "substantially free from" we mean less than about 0.1 weight % gel particles and/or branched polymer chains. Low crosslinker concentration in the HEMA monomer is therefore required. Preferably the amount of crosslinker is less than about 1%, more preferably less than about 0.5% and in some embodiments less than about 0.25% based upon all components present. All weight % are based upon all components present unless otherwise specified. Crosslinkers are compounds with two or more polymerizable functional groups. Examples of crosslinkers include TEGDMA (tetraethyleneglycol dimethacrylate), TrEGDMA (triethyleneglycol dimethacrylate), trimethylolpropane trimethacrylate (TMPTMA) and ethyleneglycol dimethacylate (EGDMA). EGDMA is frequently present in the commercial 2-hydroxyethyl methacrylate monomer which is used to make the poly-HEMA of the present invention. Care must therefore be taken to purchase HEMA monomer which has low EGDMA concentration as defined herein. Suitable grades of HEMA monomer may be purchased from Röhm GmbH Chemische Fabrik D-64 293 Darmstadt Germany.

Suitable comonomers which may be polymerized with the HEMA monomer include hydrophilic monomers such as vinyl-containing monomers and hydrophobic monomers as well as tinted monomers giving light absorption at different wavelengths. The term "vinyl-type" or "vinyl-containing" monomers refer to monomers comprising the vinyl group (—CR=CR'R", in which R, R' and R" are monovalent substituents), which are known to polymerize relatively easily. Suitable vinyl-containing monomers include N,N-dimethyl acrylamide (DMA), glycerol methacrylate (GMA), 2-hydroxyethyl methacrylamide, polyethyleneglycol monomethacrylate, methacrylic acid (MAA), acrylic acid, N-vinyl lactams (e.g. N-vinyl-pyrrolidone, or NVP), N-vinyl-N-methyl acetamide, N-vinyl-N-ethyl acetamide, N-vinyl-N-ethyl formamide, N-vinyl formamide, vinyl carbonate monomers, vinyl carbamate monomers, oxazolone monomers mixtures thereof and the like.

Still further examples are the hydrophilic vinyl carbonate or vinyl carbamate monomers disclosed in U.S. Pat. Nos. 5,070,215, 4,711,943 and the hydrophilic oxazolone monomers disclosed in U.S. Pat. No. 4,910,277, the disclosures of which are incorporated herein by reference. Other suitable hydrophilic monomers will be apparent to one skilled in the art.

More preferred hydrophilic monomers which may be incorporated into the polymer of the present invention include hydrophilic monomers such as DMA, GMA, 2-hydroxyethyl methacrylamide, NVP, polyethyleneglycol monomethacrylate, MAA, acrylic acid and mixtures thereof. DMA, GMA and MAA are the most preferred in certain embodiments.

It is important that the selected hydrophobic monomers are polymerized with the HEMA in a concentration and using methods which result in adequate solubility of the resulting poly-HEMA in the selected diluent and which also do not hinder the reactivity of the hydroxyl groups on the poly-HEMA or the reactivity of the crosslinkable functional groups on the crosslinkable prepolymer.

Suitable hydrophobic monomers include silicone-containing monomers and macromers having a polymerizable vinyl group. Preferably the vinyl group is a methacryloxy group. Examples of suitable silicone containing monomers and macromers include mPDMS type monomers, which comprise at least two [—Si—O—] repeating units, SiGMA type monomers which comprise a polymerizable group having an average molecular weight of about less than 2000 Daltons, a hydroxyl group and at least one "—Si—O—Si—" group and TRIS type monomers which comprise at least one Si(OSi—)$_3$ group. Examples of suitable TRIS monomers include methacryloxypropyltris(trimethylsiloxy)silane, methacryloxypropylbis(trimethylsiloxy)methylsilane, methacryloxypropylpentamethyldisiloxane, mixtures thereof and the like.

Preferably, the mPDMS type monomers comprise total Si and attached O in an amount greater than 20 weight percent, and more preferably greater than 30 weight percent of the total molecular weight of the silicone-containing monomer. Suitable mPDMS

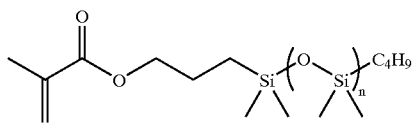

monomers have the formula.

Examples of suitable linear mono-alkyl terminated polydimethylsiloxanes ("mPDMS") include:

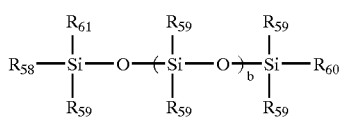

where b=0 to 100, where it is understood that b is a distribution having a mode approximately equal to a stated value, preferably 4 to 16, more preferably 8 to 10; $R_{58}$ comprises a polymerizable monovalent group containing at least one ethylenically unsaturated moiety, preferably a monovalent group containing a styryl, vinyl, (meth)acrylamide or (meth)acrylate moiety, more preferably a methacrylate moiety; each $R_{59}$ is independently a monovalent alkyl, or aryl group, which may be further substituted with alcohol, amine, ketone, carboxylic acid or ether groups, preferably unsubstituted monovalent alkyl or aryl groups, more preferably methyl; $R_{60}$ is a monovalent alkyl, or aryl group, which may be further substituted with alcohol, amine, ketone, carboxylic acid or ether groups, preferably unsubstituted monovalent alkyl or aryl groups, preferably a $C_{1-10}$ aliphatic or aromatic group which may include hetero atoms, more preferably $C_{3-8}$ alkyl groups, most preferably butyl; and $R_{61}$ is independently alkyl or aromatic, preferably ethyl, methyl, benzyl, phenyl, or a monovalent siloxane chain comprising from 1 to 100 repeating Si—O units.

The mPDMS type monomers are disclosed more completely in U.S. Pat. No. 5,998,498, which is incorporated herein by reference.

Preferably in the SiGMA type monomer silicon and its attached oxygen comprise about 10 weight percent of said monomer, more preferably more than about 20 weight percent. Examples of SiGMA type monomers include monomers of Formula I

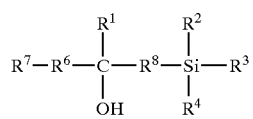

Wherein the substituents are as defined in U.S. Pat. No. 5,998,498, which is incorporated herein by reference.

Specific examples of suitable SiGMA type monomers include 2-propenoic acid, 2-methyl-2-hydroxy-3-[3-[1,3,3,3-tetramethyl-1-[trimethylsilyl)oxy]disiloxanyl]propoxy]propyl ester

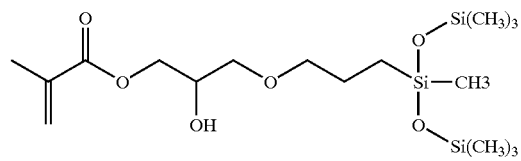

and (3-methacryloxy-2-hydroxypropyloxy)propyltris(trimethylsiloxy)silane.

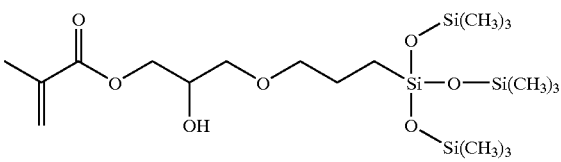

Additional suitable hydroxyl-functionalized silicone containing monomers are disclosed in U.S. Pat. Nos. 4,235,985 4,139,513 and 4,139,692 which are hereby incorporated by reference.

Yet further examples of SiGMA type monomers include, without limitation (3-methacryloxy-2-hydroxypropyloxy)propylbis(trimethylsiloxy)methylsilane.

It is essential that the ratio between hydrophilic and hydrophobic monomers is such that a functionalized crosslinkable prepolymer prepared from the poly-HEMA can be dissolved and cured in the hydrophilic diluents described below.

Also hydrophobic monomers like methylmethacrylate and ethylmethacrylate may be incorporated into the poly-HEMA to modify the water absorption, oxygen permeability, or other physical properties as demanded by the intended use. The amount of comonomer is generally less than about 50 weight %, and preferably between about 0.5 and 40 weight %. More specific ranges will depend upon the desired water content for the resulting hydrogel, the solubility of the monomers selected and diluent selected. For example, when the comonomer comprises MMA, it may be beneficially included in amounts less than about 5 weight % and preferably between about 0.5 and about 5 weight %. In another embodiment the comonomer comprises GMA in amounts between up to about 50 weight %, preferably between about 25 and about 45 weight %. In yet another embodiment the comonomer comprises DMA in amounts up to about 50 weight %, and preferably in amounts between about 10 and about 40 weight %.

Initiators and chain transfer agents may also be used. Any desirable initiators may be used including, without limitation, thermally activated initiators, UV and/or visible light photoinitiators and the like and combinations thereof. Suitable thermally activated initiators include lauryl peroxide, benzoyl peroxide, isopropyl percarbonate, azobisisobutyronitrile, 2,2-azobisisobutyronitrile, 2,2-azobis-2-methylbutyronitrile and the like. Preferred initiators comprise 2,2-azobis-2-methylbutyronitrile (AMBM) and/or 2,2-azobisisobutyronitrile (AIBN).

The initiator is used in the reaction mixture in effective amounts, e.g., from about 0.1 to about 5 weight percent, and preferably from about 0.1 to about 2 parts by weight per 100 parts of reactive monomer.

The poly-HEMA of the present invention may be formed in a number of ways. In one embodiment HEMA monomer and any desired comonomers are polymerized via free radical polymerization. The polymerization is conducted in any solvent, which is capable of dissolving the HEMA monomer and the resulting poly-HEMA during the polymerization. Suitable solvents for the polymerization of the HEMA monomer include alcohols, glycols, polyols, aromatic hydrocarbons, ethers, esters, ester alcohols, ketones, sulfoxides, pyrrolidones, amides mixtures thereof and the like. Specific solvents include methanol, ethanol, isopropanol, 1-propanol, methyllactate, ethyllactate, isopropyllactate, glycolethers like the Dowanol range of products, ethoxypropanol, DMF, DMSO, NMP, cyclohexanone, mixtures thereof and the like. Preferred solvents include alcohols having one to four carbon atoms and more preferably, ethanol, methanol and isopropanol. Sufficient solvent must be used to dissolve the monomers. Generally about 5 to about 25 weight % monomers in the solvent is suitable.

The free radical polymerization is conducted at temperatures between about 40° and about 150° C. The upper limit will be determined by the pressure limitation of the equipment available and the ability to handle the polymerization exotherm. The lower limit will be determined by the maximum acceptable reaction time and/or properties of initiator. For polymerization at about ambient pressure a preferred temperature range is between about 50° C. and about 110° C., and more preferably between about 60° to about 90° C. and for times necessary to provide the desired degree of conversion. A free radical polymerization reaction proceeds relatively fast. Between about 90 to about 98% of the monomer reacts within about one to about 6 hours. If a more complete conversion is desired, (greater than about 99%), the reaction may be conducted from about 12 to about 30 hours, and more preferably between about 16 and about 30 hours. Since the poly-HEMA prepared in the polymerization step in many instances will undergo a fractionation to remove low molecular weight species, it may not, in all embodiments, be required to bring the polymerization process to a high degree of conversion. Pressure is not critical and ambient pressures may be conveniently used.

Chain transfer agents may optionally be included. Chain transfer agents useful in forming the poly-HEMA used in the invention have chain transfer constants values of greater than about 0.001, preferably greater than about 0.2, and more preferably greater than about 0.5. Suitable such chain transfer agents are known and include, without limitation, aliphatic thiols of the formula R—SH wherein R is a $C_1$ to $C_{12}$ aliphatic, a benzyl, a cycloaliphatic or $CH_3(CH_2)_x$—SH wherein x is 1 to 24, benzene, n-butyl chloride, t-butyl chloride, n-butyl bromide, 2-mercapto ethanol, 1-dodecyl mercaptan, 2-chlorobutane, acetone, acetic acid, chloroform, butyl amine, triethylamine, di-n-butyl sulfide and disulfide, carbon tetrachloride and bromide, and the like, and combinations thereof. Generally, about 0 to about 7 weight percent based on the total weight of the monomer formulation will be used. Preferably dodecanethiol, decanethiol, octanethiol, mercaptoethanol, or combinations thereof is used as the chain transfer agent.

In some embodiments it is preferred to polymerize the poly-HEMA without a chain transfer agent. In this case alcohols are used as the solvent, preferably alcohols having one to four carbon atoms, and preferably the solvent is methanol, ethanol, isopropanol and mixtures thereof.

The poly-HEMA formed in the free radical polymerization has a polydispersity which is too high for direct use in the present invention. This is caused by the reaction kinetics of the process in which an important terminating reaction is a combination of two growing polymer chains. Accordingly, when using free radical polymerization to form the poly-HEMA of the present invention it is necessary to purify the poly-HEMA either before or after functionalization to remove the polymer having molecular weights outside the desired range. Any method capable of separating a material based upon molecular weight may be used.

Fractionation using solvent/non-solvents may be used. Purification of HEMA copolymers via precipitation via the drop-wise addition of a HEMA copolymer to a non-solvent has been described in U.S. Pat. No. 4,963,159. The precipitated HEMA copolymer may then be dissolved in a solvent to obtain a solution that is substantially free from unpolymerized monomer.

The solvent and non-solvent may be selected on the bases of Hansen Solubility parameters to remove undesirably high molecular weight poly-HEMA to form the poly-HEMA of the present invention. Hansen Solubility Parameters describe polymer-liquid interactions and each solvent and polymer can be assigned a set of three parameters $\delta_H$, $\delta_P$, $\delta_D$, describing their interactions. A description of the system is found in Handbook of Polymer Liquid Interaction Parameters and Solubility Parameter, CRC Press, Inc. 1990 and Handbook of Solubility Parameters and Other Cohesion Parameters, A. F. M. Barton, CRC Press, 1985, Table 5. Each set of three parameters defines a point in a three-dimensional solubility space.

For a liquid to act as a solvent for a polymer, the parameters of the solvent must be close to those of the polymer. The Hansen solubility parameters of a poly-HEMA can be determined by solubility tests in which a sample of the polymer is stored in a number of different solvents. By observing whether the polymer is dissolved, swelled or unchanged, it is possible to plot a solubility sphere for the particular poly-HEMA in the solubility space substantially as described in Hansen Solubility Parameters; A User's Handbook, Charles M. Hansen, pg 43–53, CRC Press 2000 and CMH's Sphere computer program for the calculations. Parameters for some poly-HEMA compositions are listed in Table 1, below and plotted in FIG. 1.

TABLE 1

| MW (kDaltons) | D | P | H | R |
|---|---|---|---|---|
| 75 | 16.9 | 18.1 | 20.1 | 8.3 |
| 55 | 17.2 | 16 | 17 | 10.4 |
| 35 | 18 | 15.2 | 15.4 | 11.7 |
| 23 | 17 | 14.2 | 13.6 | 13.2 |
| 14 | 17 | 14.2 | 13.6 | 13.2 |
| 2 | 18 | 14 | 13.2 | 13.7 |
| 1.3 | 18 | 14 | 13.2 | 13.7 |

For fractionation the poly-HEMA is dissolved in a solvent that is inside the solubility sphere for the polymer. Suitable solvents have solubility parameters in the following ranges: $\delta_D$ from about 13 to about 20, $\delta_P$ from about 5 to about 18, and $\delta_H$ from about 10 to about 25. More preferred the distance between the solvent and the polymer in the three-dimensional solubility space should not exceed the following values: $\delta_D$ from about 5 to about 10, $\delta_P$ from about 4 to about 12, $\delta_H$ from about 10 to about 6.

Once the poly-HEMA is dissolved, a non-solvent that decreases (moves toward the origin) at least one of the solubility parameters of the resultant separation mixture is gradually added to the dissolved poly-HEMA solution until the desired degree of precipitation of high molecular weight material is obtained. It is not necessary to reduce all three solubility parameters. In many embodiments it will be sufficient to reduce only one of the parameters such as the $\delta_H$ parameter. In other embodiments it will be advantageous to reduce both the $\delta_H$ and the $\delta_P$ parameters. We have found that often a surprising small reduction (as little as about 2 to about 5 units) of the solvent parameters will give the desired separation.

The non-solvent must reduce at least one of the parameters to insure the selective precipitation of the poly-HEMA having a peak molecular weight of greater than about 90,000. If the non-solvent increases the solubility parameters of the separation mixture, precipitation is much less a function of the molecular weight, and poly-HEMA within the desired molecular weight range is lost.

When adding the non-solvent to the polymer solution it can be difficult to avoid localized high concentration of the non-solvent. This will result in a local unspecific precipitation of polymer. In such cases it will be useful to stop the addition until equilibrium is again established. Non-specific precipitation may also be minimized by increasing the temperature of the separation mixture until the mixture is clear or adding the non-solvent at a somewhat higher temperature and then lowering the temperature until the desired separation is obtained. The separation may be aided by known means such as, but not limited to, centrifugation.

The amount and rate of precipitation will vary depending upon the temperature at which the separation is conducted, the solubility parameters of the non-solvent and rate at which the non-solvent is added and whether there is adequate mixing of the non-solvent. Depending on the molecular weight of the poly-HEMA produced by the free radical polymerisation the amount of polymer precipitated may be between about 5 and about 50% of the total poly-HEMA in the solution to obtain the desired removal of high molecular weight polymer.

The high molecular weight poly-HEMA precipitates from the solvent/non-solvent mixture and may be separated by conventional means such as filtration, centrifugation and the like. If further separation is desired the fractionation can be repeated by further lowering of the solvent parameters as described above. Again it will primarily be the material with the highest molecular weight that separates out and can be removed from the solution.

The high molecular weight poly-HEMA, which is desirably selectively removed, has a high viscosity in solution. This can in some instances give a very difficult separation when using the method described above. The present invention therefore provides an alternate fractionation method wherein a homogeneous solution of poly-HEMA is cooled slightly so the polymer solution separates into two liquid phases according to molecular weight range. The method comprises the following steps:

1. Prepare a solution of poly-HEMA in a solvent using the Hansen solubility ranges and within the ranges defined above.
2. Determine the separation temperature, $T_s$, of the solution by cooling a sample of the solution until the sample becomes non-homogeneous and separates into two phases. The temperature at which the first tendency of separation or turbidity is observed is the $T_s$.
3. Cool the solution to a temperature below the $T_s$ at which two phases form,
4. Separate the two phases. The lower phase will contain the highest molecular weight material.

Using the above method, it is possible, first to remove the high molecular weight poly-HEMA, and then to remove the poly-HEMA that has a molecular weight that is lower than the desired range. So, for example, the poly-HEMA/solvent mixture is cooled to a few degrees below the $T_s$, allowed to separate into two phases, the upper phase containing low and medium molecular weight poly-HEMA is siphoned off, cooled to a lower temperature to achieve a second separation, the second upper phase, which is a thin solution of the low end fraction, is siphoned off, and the second lower phase, which primarily contains the desired low polydispersity poly-HEMA is worked up. The poly-HEMA in the second lower phase has a considerably reduced amount of high and low molecular weight poly-HEMA.

For many applications the polymer obtained from this second lower phase can be used directly. It is possible to carry out a further fractionation by repeating the process described above.

It is possible to influence the $T_s$, by proper choice of solvent. For example a solution of poly-HEMA in isopropanol will have a higher $T_s$ than a solution in which the solvent is ethanol. By using mixtures of solvents it is possible to fine tune the temperature at which the best separation can be obtained. Suitable solvents which are useful for fractionation based upon $T_s$ include solvents having low $\delta_H$ and the $\delta_P$ parameters, and preferably $\delta_H$ less than about 4 and the $\delta_P$ less than about 6. Specific examples include hexane and heptane. This may be useful when the purpose is to remove the low-end material from a solution from which the high molecular weight poly-HEMA has already been removed. To obtain a renewed separation it is often required to use temperatures well below room temperature such as from about 5 to about 10° C. In such cases it can be practical to add a minor amount of a solvent that raises the separation temperature to a more practical level, for example where the poly-HEMA solution remains a liquid, e.g., between about ambient and about 50° C.

The $T_s$ is also influenced by the concentration and polydispersity of the poly-HEMA in the solution. For instance, the removal of high and low molecular weight poly-HEMA may result in a poly-HEMA that in solution gives a higher $T_s$ than the original, more polydisperse material. Also dilution to lower concentration may lead to separation at higher temperature. It is possible that the reason for this is that a certain concentration of low molecular weight poly-HEMA chains may help to keep the longer chains in solution.

By manipulation of polymer concentration, choice of solvent, and separation temperature it is possible to influence both the volume ratio between the two phases as well as the concentration of poly-HEMA in each.

Suitable temperature ranges for the fractionation include those between about 5 to about 50° C. Suitable standing times include between about 1 hour to about 7 days.

The amount of poly-HEMA discharged with the high molecular weight material should be from about 10 weight % to about 50 weight % of the poly-HEMA. Removal of about 5 to about 40 weight % with the low molecular weight fraction is often practical, and the yield of poly-HEMA with low polydispersity after removal of high and low molecular weight material may be about 10 to about 90% and preferably about 30 to about 80% of the original amount. The reduced yield is however a minor consideration since the poly-HEMA produced by free radical polymerization is relatively inexpensive and the fractionated material is of high value in many applications.

In a preferred poly-HEMA the amount of polymer molecules with molecular weight less than about 15,000 is less than about 10%, preferably less than about 5% and more preferably less than about 2%.

It will be evident from the description and the examples that the fractionation methods are flexible and can be adapted according to the nature of the specific polymer. The conditions required to obtain the desired degree of polydispersity can easily be determined by simple small-scale experiments using the above disclosure.

Suitable temperature ranges include about 5 to about 50° C. Suitable standing times include between about 1 hour and to about 7 days.

One important advantage of poly-HEMA prepared by free radical polymerization followed by fractionation is that the initiators and other additives used in the polymerization have been used for many years, and their toxicology is known and well described. This is important when the poly-HEMA, the crosslinkable prepolymer or the resulting hydrogel is used in a medical application.

In one embodiment only the low molecular weight fraction is removed from the poly-HEMA. This can be done by the solvent/non-solvent process described above. In a preferred embodiment the low molecular weight material is removed during the washing step after the poly-HEMA has been functionalized.

The poly-HEMA of the present invention may also be formed directly by anionic polymerization or controlled free radical polymerization, such as with a TEMPO type polymerization, ATRP (atom transfer radical polymerization), GTP (Group transfer polymerization), and RAFT (Reversible addition-fragmentation chain transfer polymerization).

General conditions for the above processes are known and disclosed in "Controlled Radical Polymerization"; Krzysztof Matyjaszewski, editor; ACS Symposium Series 685; American Chemical Society, Washington, D.C.; 1998. For example, for anionic polymerization the desired silyl protected monomer is dissolved in a suitable solvent, such as THF solution. The reaction is conducted at reduced temperature, between about −60° C. and about −90 ° C. using known initiators such as 1,1-diphenylhexyllithium as initiator. The polymerization may be terminated by conventional means, such as, but not limited to degassed methanol.

The poly-HEMA compositions having a specific molecular weight range and polydispersity can be used to make crosslinkable prepolymers with well-defined polydispersity and molecular weight. As but one example, the crosslinkable prepolymers can have acrylic groups which can be crosslinked by UV in an extremely short time to form contact lenses with very desirable properties so far unobtainable by conventional methods.

The poly-HEMA is functionalized to form a crosslinkable prepolymer by attaching a crosslinkable functional group thereto. Generally the functional group provides the ability to crosslink and form crosslinked polymers or hydrogels to the prepolymer. Suitable reactants that provide the crosslinkable functional groups have the structure A-S-F, where A is an attaching group which is capable of forming a covalent bond with a hydroxyl group in the poly-HEMA; S is a spacer and F is a functional group comprising an ethylenically unsaturated moiety. Suitable attaching groups, A, include chloride, isocyanates, acids, acid anhydrides, acid chlorides, epoxies, azalactones, combinations thereof and the like. Preferred attaching groups include acid anhydrides.

The spacer may be a direct bond, a straight, branched or cyclic alkyl or aryl group having 1 to 8 carbon atoms and preferably 1 to 4 carbon atoms or a polyether chain of the formula —(CH$_2$—CH$_2$—O)$_n$— where n is between 1 and 8 and preferably between 1 and 4.

Suitable functional groups comprise free radical polymerizable ethylenically unsaturated moieties. Suitable ethylenically unsaturated groups have the formula $$-C(R^{10})=CR^{11}R^{12}$$

Where $R^{10}$, $R^{11}$ and $R^{12}$ are independently selected from H, $C_{1-6}$ alkyl, carbonyl, aryl and halogen. Preferably $R^{10}$, $R^{11}$ and $R^{12}$ are independently selected from H, methyl, aryl and carbonyl, and more preferably in some embodiments selected from H and methyl.

Preferred reactants include methacrylic acid chloride, 2-isocyanatoethylacrylate, isocyanatoethyl methacrylate (IEM), glycidyl methacrylate, cinnamic acid chloride, methacrylic acid anhydride, acrylic acid anhydride and 2-vinyl-4-dimethylazalactone. Methacrylic acid anhydride is preferred.

Suitable amounts of the crosslinkable functional group attached to the poly-HEMA include from about 1 to about 20%, and preferably between about 1.5 to about 10%, and most preferably from about 2 to about 5% on a stoichiometric basis based upon the amount of available hydroxyl groups in the poly-HEMA. The degree of functionalization may be measured by known methods such as determination of unsaturated groups or by hydrolysis of the bond between the functional reactant and the polymer followed by determination of the released acid by HPLC.

Depending on the attaching group selected, the functionalization may be conducted with or without a conventional catalyst. Suitable solvents include polar, aprotic solvents which are capable of dissolving the poly-HEMA at the selected reaction conditions. Examples of suitable solvents include dimethylformamide (DMF), hexamethylphosphoric triamide (HMPT), dimethyl sulfoxide (DMSO), pyridine, nitromethane, acetonitrile, dioxane, tetrahydrofuran (THF) and N-methylpyrrolidone (NMP). Preferred solvents include formamide, DMF, DMSO, pyridine, NMP and THF. When IEM is used the catalyst is a tin catalyst and preferably dibutyl tin dilaurate.

The functionalization reaction mixture may also contain a scavenger capable of reacting with moieties created by the functionalization. For example, when acid anhydrides are used as the attaching group, it may be beneficial to include at least one tertiary amine, a heterocyclic compound with an aprotic nitrogen or other lewis bases to react with the carboxyl group which is generated. Suitable tertiary amines include pyridine, triethylenediamine and triethylamine, with triethylamine being preferred. If included the tertiary amine may be include in a slight molar excess (about 10%). In a preferred embodiment the solvent is NMP, the reactant is methacrylic acid anhydride, acrylic acid anhydride or a mixture thereof and triethylamine is present. The most preferred reactant is methacrylic acid anhydride.

The reaction is run at about room temperature. Each functional group will require a specific temperature range, which is understood by those of skill in the art. Ranges of about 0° C. and 50° C. and preferably about 5° C. and about 45° C. are suitable. Ambient pressures may be used. For example, when the crosslinkable functional group is an acid anhydride the functionalization is conducted at temperatures between about 5° C. and about 45° C. and for times ranging from about 20 to about 80 hours. It will be appreciated by those of skill in the art, that ranges outside those specified may be tolerated by balancing the time and temperatures selected.

The reaction is run to produce a crosslinkable prepolymer with a poly-HEMA backbone having a molecular weight and polydispersity as defined above.

Apart from attaching crosslinkable side groups other side groups may provide additional functionality including, but not limited to photoinitiators for crosslinking, pharmaceutical activity and the like. Still other functional groups may contain moieties that can bind and/or react with specific compounds when the crosslinked gels are used in analytical diagnostic applications.

Once the crosslinkable prepolymer has been formed, substantially all unreacted reactants and byproducts should be removed. By "substantially all" we mean that less than about 0.1 weight % remains after washing. This can be done by conventional means, such as ultrafiltration. However, in the present invention it is possible to purify the crosslinkable prepolymer by swelling the prepolymer with water and rinsing with water to remove substantially all of the undesired constituents including monomeric, oligomeric or polymeric starting compounds and catalysts used for the preparation of the poly-HEMA and byproducts formed during the preparation of the crosslinkable prepolymer. The washing is conducted with deionized water and conditions are selected to provide a large surface to volume ratio of the crosslinkable prepolymer particles. This can be done by freeze drying the crosslinkable prepolymer, making a thin film from the crosslinkable prepolymer, extruding the crosslinkable prepolymer into rods, nebulizing the crosslinkable prepolymer solution into the deionized water, and other like methods, which are know to those skilled in the art.

The washings may be conducted in batches with about 3 to about 5 water replacements at room temperature and the equilibrium time between water replacements can be shortened by washing (extracting) at elevated temperatures below about 50° C.

This process has numerous advantages over methods of the prior art. The water removes impurities which would leach out during storage and use, providing confidence that a pure material, suitable for the end use, has been produced.

In one embodiment unfractionated poly-HEMA having polydispersity outside the preferred range, or poly-HEMA from which only the high molecular weight material has been removed, is functionalized and the functionalized material is washed repeatedly with large volumes of water to remove reactants and poly-HEMA of low molecular weight. By this method a very pure functionalized poly-HEMA of low polydispersity such as below 2.0, preferred below 1.7 and more preferred below 1.5, can be obtained. The functionalized crosslinkable poly-HEMA obtained by this method comprises less than 10%, preferably less than 5% and more preferably less than 2% of poly-HEMA of molecular weight smaller than about 15,000.

The extent to which the small molecules should be removed depends on the degree of functionalization and the intended use. Preferably, during cure, all poly-HEMA molecules should become bound into the polymer network by at least two covalent bonds. Due to the statistical nature of the functionalization and the cure, the probability that a poly-HEMA molecule will be bound into the polymer network through only one covalent bond or none at all increases with decreasing peak molecular weight and decreasing degree of functionalization.

For lower functionalization relatively more of the low molecular weight material should be removed. The correct amount can easily be determined by experiments comparing removal and mechanical properties.

Once the crosslinkable prepolymer has been purified it is then dissolved in a water replaceable diluent to form a viscous solution. The diluent should function as a medium in which the crosslinkable functionalized poly-HEMA prepolymer can be dissolved and in which the crosslinking reaction or cure can take place. In all other respects the diluent should be non-reactive. Suitable diluents include those capable of dissolving, at or below 65° C., between about 30 weight % to about 60 weight % crosslinkable prepolymer based upon the total weight of the viscous solution. Specific examples include alcohols having one to four carbon atoms, and preferably methanol, ethanol, propanol and mixtures thereof. Water may be used as a co-diluent in minor amounts such as less than about 50% of the total diluent. For hydrogels, diluents should be added to the crosslinkable prepolymer in an amount which is approximate or equal to the amount of water present in the final hydrogel. Diluent amounts between about 40 and about 70 weight % of the resulting viscous solution are acceptable.

Viscous solutions of the present invention have a viscosity of about 50,000 cps to about $1 \times 10^7$ cps at 25° C., preferably of about 100,000 cps to about 1,000,000 cps at 25° C., and more preferably of about 100,000 cps to about 500,000 cps at 25° C.

Preferably the diluents are also safe for the article's intended end use. So, for example, when the article being formed is a contact lens, the solvent should preferably be safe for ocular contact and ophthalmically compatible. This is particularly important for diluents that will not or will only partially be removed from the resulting article prior to use. Diluents that will not be evaporated from the resulting article should have the capability to bring the Tg of the viscous solution to below about room temperature, (preferably a Tg less than about −50° C.) and low vapor pressures (boiling point above about 180° C). Examples of biocompatible diluents include polyethylene glycols, glycerol, propylene glycol, dipropylene glycol mixtures thereof and the like. Preferred polyethylene glycols have molecular weights between about 200 and 600. Use of biocompatible diluents allows the removal of a separate, washing/evaporation step to remove the diluents.

Low boiling diluents may also be used, but may require an evaporation step for diluents which are not compatible with the intended use environment. Low boiling diluents are polar and generally have low boiling points (less than about 150° C.), which make removal via evaporation convenient. Suitable low boiling diluents include alcohols, ethers, esters, glycols, mixtures thereof and the like. Preferred low boiling diluents include alcohols, ether alcohols, mixtures thereof and the like. Specific examples of low boiling diluents include 3-methoxy-1-butanol, methyl lactate, 1-methoxy-2-propanol, 1-ethoxy-2-propanol, ethyl lactate, isopropyl lactate, mixtures thereof and the like.

A polymerization initiator may also be added. The initiator may be any initiator that is active at the processing conditions. Suitable initiators include thermally activated, photoinitiators (including UV and visible light initiators) and the like. Suitable thermally activated initiators include lauryl peroxide, benzoyl peroxide, isopropyl percarbonate, azobisisobutyronitrile, 2,2-azobis isobutyronitrile, 2,2-azobis 2-methylbutyronitrile and the like. Suitable photoinitiators include aromatic alpha hydroxyketone or a tertiary amine plus a diketone. Illustrative examples of photoinitiator systems are 1-hydroxycyclohexylphenyl ketone, 2-hydroxy-methyl-1-phenyl-propan-1-one, benzophenone, thioxanthen-9-one, a combination of camphorquinone and ethyl-4-(N,N-dimethylamino)benzoate or N-methyldiethanolamine, hydroxycyclohexyl phenyl ketone, bis(2,4,6-trimethylbenzoyl)-phenyl phosphine oxide and bis(2,6-dimethoxybenzoyl)-2,4,4-trimethylpentyl phosphine oxide, (2,4,6-trimethylbenzoyl)diphenyl phosphine oxide and combinations thereof and the like. Photoinitiation is a preferred method and bis(2,6-dimethoxybenzoyl)-2,4,4-trimethylpentyl phosphine oxide, bis(2,4,6-trimethylbenzoyl)-phenyl phosphine oxide and 2-hydroxy-methyl-1-phenyl-propan-1-one are preferred photoinitiators. Other initiators are known in the art, such as those disclosed in U.S. Pat. No. 5,849,841, at column 16, the disclosure of which is incorporated herein by reference.

Other additives which may be incorporated in the prepolymer or the viscous solution include, but are not limited to, ultraviolet absorbing compounds, reactive dyes, organic and inorganic pigments, dyes, photochromic compounds, release agents, antimicrobial compounds, pharmaceuticals, mold lubricants, wetting agents, other additives desirable to maintain a consistent product specification, (such as but not limited to TMPTMA) combinations thereof and the like. These compositions may be added at nearly any stage and may be copolymers, attached or associated or dispersed.

The viscous solution should preferably not contain compounds such as free monomers which can, during cure, give polymer material which is not bound up in the network and/or will give residual extractable material.

In a solution of a polymer the rheological properties are to a high degree determined by the longest molecules. The poly-HEMA of the present invention is low in molecules of very high molecular weight and this gives their solutions a number of desirable properties.

The viscous solutions of the present invention have beneficially short relaxation times. Relaxation times are less than about 10 seconds, preferably less than about 5 seconds and more preferably less than about 1 second. Short relaxation times are beneficial because prepolymers having them are capable of relieving flow induced stresses prior to curing so the cured polymer network is free of locked-in stresses. This allows the viscous solutions of the present invention to be processed without long "hold" times between closing the mold and curing the viscous solution.

The poly-HEMA of the present invention may be used as starting materials for making functionalized poly-HEMA prepolymers and hydrogels, binders for tints in contact lenses, binders in inks for tampo and ink jet printing and the like.

The viscous solution of the present invention may be used to form a variety of articles. For example molded articles, profiles, preforms, parisons, films, fiber, tubing, sheet, coatings and the like. More specifically, suitable articles include biomedical devices, medical grade coatings, polymers with reactive groups or biological assay markers which are bound to the polymer and the like.

As used herein, a "biomedical device" is any article that is designed to be used while either in or on mammalian tissues or fluid. Examples of these devices include but are not limited to catheters, implants, stents, fluid collection bags, sensors, hydrogel bandages, tubing, coatings for any of the preceding articles, carriers for antibiotic, diagnostic and therapeutic agents, and ophthalmic devices. A class of preferred biomedical devices include ophthalmic devices, particularly contact lenses.

As used herein, the terms "lens" and "ophthalmic device" refer to devices that reside in or on the eye. These devices can provide optical correction, wound care, drug delivery, diagnostic functionality or may be cosmetic. The term lens includes but is not limited to soft contact lenses, hard contact lenses, intraocular lenses, overlay lenses, ocular inserts, optical inserts and spectacle lenses.

A number of methods may be used to form the articles of the present invention including injection molding, extrusion molding, spin casting, extrusion coating, closed mold molding, cast molding, combinations thereof and the like. The forming method will be followed by a curing step, described below.

In one embodiment of the present invention the prepolymer solution is used to form a lens. The preferred method for producing a lens from the viscous solution of the present invention is via direct molding. A lens-forming amount of the prepolymer solution is dispensed into a mold having the shape of the final desired hydrogel. The mold may be made from any suitable material including, without limitation, polypropylene, polystyrene and cyclic polyolefins.

By "lens-forming amount" is meant an amount sufficient to produce a lens of the size and thickness desired. Typically, about 10 to about 50 μl of viscous solution is used per contact lens. Next the mold parts are assembled such that the viscous liquid fills the mold cavity. A benefit of the present invention is that the hold time necessary between assembling the mold parts and curing is very short.

We have found that to avoid introducing unwanted stresses into the final article, it is necessary to allow the viscous solution to rest in the closed mold for a period two to three times longer than the viscous solution's relaxation time. The viscous solution of the present invention have beneficially short relaxation times at room temperature (less than about 10 seconds, preferably less than about 5 seconds, and more preferably less than about 1 second) which allow for hold times which are generally less than about 30 seconds, preferably less than about 10 seconds and more preferably less than about 5 seconds.

An additional benefit of the short holding times of the present invention is that they minimize oxygen diffusion into the crosslinkable prepolymer from the mold parts. Diffusion of oxygen can impair the curing process at the surface of the article. It will be appreciated that the viscous solution may be held for longer than the times specified in low oxygen content molds with minimal or no negative impact other than slower production times.

The mold containing the viscous solution is exposed to ionizing or actinic radiation, for example electron beams, X-rays, UV or visible light, ie. electromagnetic radiation or particle radiation having a wavelength in the range of from about 280 to about 650 nm. Also suitable are UV lamps, HE/Cd, argon ion or nitrogen or metal vapor or NdYAG laser beams with multiplied frequency. The selection of the radiation source and initiator are known to those of skill in the art. Those of skill in the art will also appreciate that the depth of penetration of the radiation in to the viscous solution and the crosslinking rate are in direct correlation with the molecular absorption coefficient and concentration of the selected photoinitiator. In a preferred embodiment the radiation source is selected from UVA (about 315–about 400 nm), UVB (about 280–about 315) or visible light (about 400–about 450 nm), at high intensity. As used herein the term "high intensity" means those between about 100 mW/cm$^2$ to about 10,000 mW/cm$^2$. The cure time is short, generally less than about 30 seconds and preferably less than about 10 seconds. The cure temperature may range from about ambient to elevated temperatures of about 90° C. For convenience and simplicity the curing is preferably conducted at about ambient temperature. The precise conditions will depend upon the components of lens material selected and are within the skill of one of ordinary skill in the art to determine.

The cure conditions must be sufficient to form a polymer network from the crosslinkable prepolymer. The resulting polymer network is swollen with the diluent and has the form of the mold cavity.

Once curing is completed, the molds are opened. Post molding purification steps to remove unreacted components or byproducts are either simplified compared to conventional molding methods, or are not necessary in the present invention. If a biocompatible diluent is used no washing or evaporating step is required at this phase either. It is an advantage of the present invention that when a biocompatible diluent is used, both post molding extraction and diluent exchange steps are not required. If a low boiling diluent is used, the diluent should be evaporated off and the lens hydrated with water.

The resulting lenses comprise a polymer network, which when swelled with water becomes a hydrogel. Hydrogels of the present invention may comprise between about 20 to about 75 weight % water, and preferably between about 20 to about 65 weight % water. The hydrogels of the present invention have excellent mechanical properties, including modulus and elongation at break. The modulus is at least about 20 psi, preferably between about 20 and about 90 psi, and more preferably between about 20 and about 70 psi.

The elongation at break is greater than about 100% and preferably greater than about 120%. Due to the absence of loose polymer chains, the hydrogels will after high relative deformation such as 100% return to their original shape without distortion. The hydrogels of the present invention are also free from visible haze and distortion. The foregoing combination of properties makes the hydrogels of the present invention excellently suited for use as ophthalmic devices and particularly soft contact lenses.

Lenses thus produced may be transferred to individual lens packages containing a buffered saline solution. The saline solution may be added to the package either before or after transfer of the lens. Lenses containing a biocompatible diluent will, upon standing in the saline solution, exchange the diluent with water, forming the desired hydrogel. This may also be accomplished in a separate step, if desired. While stored in the package, the polymer network will take up a specific amount of water determined by the hydrophilicity of the polymer. The equilibrium water content (expressed in weight % of the hydrated lens) may be higher or lower than the amount of the diluent present during curing. Typical hydrogels which are useful for making contact lenses comprise between about 20 and about 75 weight % water. The hydrogel may thus expand or contract when in equilibrium in water. It is, however, an essential feature that although the size may change, the shape of the fully hydrated article will be a true reproduction of the shape of the mold cavity.

In a preferred embodiment the amount of diluent is carefully chosen to give a lens that will not expand or contract when in equilibrium in water and is a true 1:1 reproduction of the mold cavity, which is an advantage for predicting the optical parameters of the resulting lens.

Appropriate packaging designs and materials are known in the art. A plastic package is releasably sealed with a film. Suitable sealing films are known in the art and include foils, polymer films and mixtures thereof.

The sealed packages containing the lenses are then sterilized to ensure a sterile product. Suitable sterilization means and conditions are known in the art, and include, for example, autoclaving.

It will be appreciated by those of skill in the art that other steps may be included in the molding and packaging process described above. Such other steps can include coating the formed lens, surface treating the lens during formation (for example via mold transfer), inspecting the lens, discarding defective lenses, cleaning the mold halves, reusing the mold halves, combinations thereof and the like. Processes and coating compositions are disclosed in of U.S. Pat. Nos. 3,854,982; 3,916,033; 4,920,184; and 5,002,794; 5,779,943, 6,087,415; WO 91/04283, and EPO 93/810,399, which are incorporated herein by reference.

The shaped articles of the present invention have very low or no tendency to distortion after being removed from the mold. Distortion has been an inherent problem of molded articles formed from functionalized prepolymers which have a high molecular weight. The presence of prepolymer chains having molecular weights which are above the ranges specified in the present invention impart a slow relaxation time to the functionalized prepolymer. During curing, the stresses caused by the unrelaxed, long chains are locked into the cured polymer network. Upon removal from the mold these stresses distort the molded article so that its shape is no longer a true replica of the mold. The crosslinkable prepolymers of the present invention have short relaxation times, which eliminates distortion upon molding.

As used herein the term "hydrogel" means a hydrated crosslinked polymeric system that contains water in an equilibrium state. Hydrogels typically are oxygen permeable and biocompatible, making them preferential materials for producing biomedical devices and in particular contact or intraocular lenses.

In the present application all molecular weights are to be understood as molecular weights determined by the gel permeation chromatography (GPC) analysis (also called Size Exclusion Chromatography) using the method developed by K. Almdal of the Risø National Laboratories, Denmark (Almdal, K., Absolute Molar Mass Distribution Determination by Size Exclusion Chromatography. Synthesis of Narrow Molar Mass Distribution Polymers. Characterization of the Molar Mass Distribution of Poly(2-Hydroxyethyl Methacrylate) by Size Exclusion Chromatography with Coupled Refractive Index and Low Angle Laser Light Scattering Detection. Risø-M-2787(v.1) (1989) 141 p).

In this method a range of polyethylene glycols and polyethylene oxides with well defined molecular weights are used in the calibration of the equipment. These standards used for p-HEMA give more accurate values for peak molecular wt and Pd than previous methods developed for more hydrophobic polymers. The method is described below.

Molecular weight may be measured as follows. The SEC equipment is composed of a column oven at 40° C., a PE LC-410 pump with PE Nelson 900A/D and a series 200 autosampler. The detector is a RI Merck L7490.

The column combination consists of two TSK-Gel columns from TosoHaas (G4000PW+G2500PW) and a guardcolumn.

The eluent is made with methanol-water (75/25 wt/wt) and adjusted to 50 mM sodium chloride (NaCl).

The flow rate is 0.5 mL/minute. The injection volume is 150 μL and the run time is 60 minutes.

The calibration curve is obtained with third order regression using PEG and PEO of Peak molecular weights ranging from 960000 to 194 as standard references. These polymer standards are purchased from Polymer Laboratories Inc, Amherst Mass. (Calibration kits PEG-10 part No 2070-0100; PEO-10 part No 2080-0101). Added standard reference PEG of Peak molecular weight of 194 gives a flow signal at a well-defined position, which is used as an internal standard or fixation point. Added NaCl plays the same role and gives a second fixation point.

Peak integrations are manually made. Integration start and end points are manually determined from significant difference on global baseline. Result reports give Mz, Mw, Mn, and Mpeak. in PEG/PEO units. Related values in HEMA units are calculated from the standard report with the following mathematical function:

$$M_{HEMA} = 10^{1,362 + 0,7854 \cdot \log M, PEG/PEO}$$

The injection solutions are prepared with methanol-water 75/25 wt/wt adjusted to 60 mM NaCl to give a polymer concentration of 2 mg/mL. Tetraethylene glycol is added to the sample in a concentration of 1 mg/ml in order to give a peak flow reference. The solutions are filtered on 0.5 μm disposable filters before the injection is performed.

In the present invention polydispersity, Pd of a polymer sample is defined as $Pd = M_w/M_n$. The peak molecular weight Mp is the molecular weight of the highest peak in the molecular weight distribution curve.

The tensile properties (elongation and tensile modulus) are measured using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Percent elongation is =[(Lf−Lo)/Lo]×100.

Tensile modulus is measured at the initial linear portion of the stress/strain curve.

The viscosity is measured using a Haake RS100 RheoStress equipped with a Haake circulation bath and temperature controller. The complex viscosity is measured by conducting a frequency sweep starting at 40 Hz, going down to 1 mHz and up again to 40 Hz, picking up 3 frequencies per decade, repeating each frequency three times and waiting one period between each measurement. The measurements are conducted at 25° C.+1° C., using a parallel plate geometry having a 20 mm diameter and a 0.7 mm gap size (sample thickness), which corresponds to a sample volume of ca. 0.22 mL. With reference to Cox-Mertz rule (John Ferry, *Visco-elastic properties of polymers*, $3^{rd}$ edition, McGraw-Hill Book Company, 1980.), the reported viscosity number ($\eta$) is the low frequency value of the complex viscosity ($\eta^*$).

The relaxation time is measured using the Haake RS100 RheoStress described above and using a shear stress of 400 Pa. The relaxation time is obtained by plotting G' and G" against the frequency, which will cross each other at a cross over frequency f, in such a way that G">G' at frequencies below f and G'>G" at frequencies above f. The relaxation time=1/f.

The actual degree of functionalization is determined by hydrolysis of the product and the liberated methacrylic acid is detected using HPLC. Hydrolysis samples are prepared from aliquots of the methanolic solution and 1 mL NaOH 1M. The hydrolysis is driven at room temperature for 12 hours at least. The methacrylic acid amount detected is compared to the amount of dry polymer contained in the sample to give the actual degree of functionalization.

Specifically, the HPLC equipment consists of a column oven at 25° C., a Merck L6000 pump, and a Perkin Elmer LC290 UV detector. The column combination is composed of a Merck RP18 column (125 mm/4 mm) and a Guardcolumn.

The mobile phase is an acetonitrile-water mixture (1/9 wt/wt) adjusted to pH 2.5 with trifluoroacetic acid. The flow rate is fixed to 1 mL/minute and the injection volume is 10 μL.

The detection is carried out at a wavelength of 230 nm. The data acquisition time is 8 minutes. Series of calibrators are generated from diluted solutions of methacrylic acid in mobile phase of concentration ranging from 5 to 25 ppm.

The injection solutions are prepared from the hydrolysis samples diluted with mobile phase and 10 mL HCl, 1M. The solutions are filtered on 13 mm GD/X 0,45 μm Whatmann filters before the injection is performed.

The following examples do not limit the invention. They are meant only to suggest a method of practicing the invention. Those knowledgeable in the field of contact lenses as well as other specialties may find other methods of practicing the invention. However, those methods are deemed to be within the scope of this invention.

The following abbreviations are used in the examples.

| | |
|---|---|
| AIBM | 2,2'-azobis(2-methylbutyronitrile) |
| DABCO | triethylene diamine |
| DMAP | N,N-dimethylaminopyridine |
| DMF | N,N-dimethylformamide |
| DMSO | dimethyl sulphoxide |
| EOH | ethanol |
| GMA | glycerol methacrylate |
| HEMA | 2-hydroxyethyl methacrylate |
| IPA | 2-propanol |
| MAA | methacrylic acid |
| MAACl | methacryloyl chloride |
| MAAH | methacrylic acid anhydride |
| NMP | 1-methyl-2-pyrrolidone |
| PEG | polyethylene glycol |
| p(TMS-HEMA) | poly(trimethylsilyloxyethyl-methacrylate) |
| Py | pyridine |
| TEA | triethylamine |
| TMS-HEMA | trimethylsilyloxyethyl-methacrylate |
| TEG | tetraethylene glycol |

EXAMPLE 1

1911.6 g ethanol, 1056.6 g HEMA monomer, 3.00 g dodecyl mercaptan, and 21.00 g methacrylic acid were blended at 25° C. The mixture was poured into a 5-liter stainless steel reactor with a three-blade stirrer, temperature control and a jacket for cooling and heating.

The mixture was heated to 68° C., and 7.50 g 2,2'-azobis (2-methylbutyronitrile) (AMBN) was added. The AMBN dissolved rapidly, and the reactor was blanketed with a slow stream of nitrogen. The temperature was held at 68° C. for 18 hours to complete conversion. The reactor was heated to 80° C. and kept at this temperature for 22 hours to destroy residual initiator and mercaptan. After cooling to room temperature a sample was withdrawn and solid content determined by evaporation at 125° C., 3–4 mm Hg for 24 hours. Solid content=37.2%. Mp=76.6 kDalton, Pd=3.75.

The poly-HEMA solution was diluted with ethanol to give a 10% solution of poly-HEMA in ethanol. The solution became turbid at 24° C. The solution was heated to 40° C. to make it homogenous and then allowed to stand at about 21° C.

After three days the solution had separated into two clear phases.
The two phases were separated and analyzed:

TABLE 2

| Fraction ID | Amount Vol. % | Solid w % | Mp kDalton | Pd |
|---|---|---|---|---|
| Top | 80 | 8.6 | 64.0 | 2.8 |
| Bottom | 20 | 15.6 | 144 | 3.34 |

The bottom fraction rich in high molecular weight polymer was discharged.

The top fraction was isolated and set at 8° C. for further fractionation. After 24 hours the solution had separated into two phases. The top fraction constituted 85% by volume of the total and contained 2.5 ww % poly-HEMA. The bottom phase constituted 15% vol. of the total solution and contained 35.7 ww % poly-HEMA. Mp 83.8 kDalton Pd=2.18. This fraction was isolated for functionalization.

EXAMPLE 2

HEMA monomer (with an impurity level lower than 0.8% purchased from Rohm) was mixed with triethylamine ($\geq$99.5% pure, from Fluka) and petrol ether (bp 40–60° C.) passed through aluminum oxide and reacted with trimethyl chlorosilane ($\geq$99.0% pure, from Fluka) to obtain trimethylsilyloxyethyl-methacrylate (TMS-HEMA). TMS-HEMA was purified by distillation from calciumhydride (once) and triethylaluminum (electronic grade, from Aldrich) (twice).

The polymerization of TMS-HEMA was carried out in THF (abs. puriss.), solution (Fluka) at −78° C. using 1,1-diphenylhexyl lithium as initiator and resulted in a quantitative yield. The polymerization was terminated by degassed methanol. The polymer was isolated by adding the THF solution of poly(trimethylsilyloxyethyl-methacrylate) p(TMS-HEMA) to a large excess of water.

The polymer had a peak molecular weight of 63 kD, Mw=75 kD and a polydispersity of 1.6.

EXAMPLE 3

1619 g ethanol, 176.5 g HEMA monomer, and 3.60 g methacrylic acid (MAA) were blended at 25° C. The mixture was poured into a 3-liter glass reactor with a stirrer, temperature control and a jacket for cooling and heating.

The mixture was heated to 68° C., and 1.26 g AMBN was added. The AMBN dissolved rapidly, and the reactor was blanketed with a slow stream of nitrogen. The temperature was held at 68° C. for 20 hours to complete conversion. After cooling to room temperature the polymer solution was diluted with ethanol to give a 10% solution of poly-HEMA in ethanol. The Mp was 70 kD and Pd was 3.33 before fractionation. After addition of 2% hexane the solution had a cloud point of 31° C. The polymer was fractionated in Example 10.

EXAMPLE 4

1625 g ethanol, 108.4 g HEMA monomer, and 72.8 g glycerol methacrylate were blended at 25° C. The mixture was poured into a 3-liter glass reactor with a stirrer, temperature control and a jacket for cooling and heating.

The mixture was heated to 74° C., and 1.29 g AMBN was added, and the reactor was blanketed with a slow stream of nitrogen. The temperature was held at 74° C. for 20 hours to complete conversion. After cooling to room temperature the polymer solution was diluted with ethanol to give a 10% solution of poly-(HEMA-co-GMA) in ethanol. The Mp was 56 kD and Pd was 2.35. The solution had a cloud point of 35° C. and was allowed to fractionate for 3 days at 33° C. The top fraction was siphoned off and the bottom fraction was discarded. To the top fraction was added 2% heptane. This gave a cloud point of 49° C. After three days at 29° C. a new top fraction had formed and was discarded. The bottom fraction containing 64% of the original polymer was isolated, and the polymer was found to have a Mp of 66 kD and a Pd of 2.1. This polymer was functionalized in Example 21.

EXAMPLES 5–9

The polymerization reaction of Example 3 was repeated at different temperatures and using the solvents shown in Table 3, below. The results are given in Table 3 and show that by using this method a good control of molecular weight is obtained.

TABLE 3

| Ex. # | T (° C.) | Solvent | Mp (kD) | Pd |
|---|---|---|---|---|
| 5 | 82 | 2-propanol | 35 | 3.4 |
| 6 | 78 | 2-propanol | 40 | 3.4 |
| 7 | 74 | Ethanol | 50 | 2.6 |
| 8 | 72 | Ethanol | 60 | 3.6 |
| 9 | 68 | Ethanol | 70 | 3.3 |

EXAMPLE 10

800 g of the solution prepared in Example 3 was heated to 40° C. to make it homogenous and then allowed to stand at 28° C. After five days the solution had separated into two clear phases. The top phase containing 77.1% of the polymer was siphoned off and the bottom phase was discarded.

The amount of hexane in the top phase was adjusted to 7%, which resulted in a cloud point of 54° C. The solution was heated to 57° C. to make it homogenous and then allowed to stand at 29° C. After four days the solution had separated into two clear phases. The top phase containing the low molecular weight fraction of the polymer was siphoned off and the bottom phase was given a third fractionation. This time the hexane concentration was adjusted to 8% and the solution was allowed to stand for four days at 30° C. The top phase containing the low molecular weight fraction of the polymer was siphoned off and the polymer in the bottom phase was isolated for functionalization. The results of the fractionation are shown in Table 4, below.

TABLE 4

|  | $M_W$ K Dalton | $M_p$ K Dalton | Pd |
| --- | --- | --- | --- |
| Unfractionated p-HEMA | 98 | 70 | 3.33 |
| Fractionated p-HEMA | 97 | 76 | 1.51 |

EXAMPLE 11

A poly-HEMA with nominal 2% MAA was prepared as in Example 3 and fractionated as described in Example 10. The amount of MAA in the non-fractionated and fractionated material was determined as described in ISO standard (3682-1983 (E)), and is shown in Table 5, below.

TABLE 5

|  | $M_W$ (kD) | $M_p$ (kD) | Pd | % MAA |
| --- | --- | --- | --- | --- |
| Unfractionated p-HEMA | 98 | 70 | 3.33 | 1.8 |
| Fractionated p-HEMA | 97 | 76 | 1.51 | 1.8 |

The MAA content in the non-fractionated copolymer is equal to the MAA content found in the fractionated copolymer. This shows that the fractionation process separates the polymer by molecular weight only and not by composition.

EXAMPLE 12

9.09 g of the poly-HEMA formed and isolated in Example 2 was dried by evaporation at 125° C., 3 mm Hg for 24 hours and then dissolved by slight warming in pyridine to make a 10% w/w solution. The solution was cooled in an ice bath and 400 μL of methacryloyl chloride (corresponding a target-value degree of esterfication of 6 mol percent of the OH-groups in the poly-HEMA) was added. The major part of the pyridine was then removed under vacuum at 25–30° C., and the functionalized copolymer was contacted with deionized water to dissolve residual pyridine and other low molecular weight materials. The water was decanted, and the washing repeated until there was no residual pyridine detectable with an HPLC system.

The functionalized polymer had a $M_P$ of 62 kD and a Pd of 1.6.

EXAMPLE 13

110 mL of anhydrous 1-methyl-2-pyrrolidone (NMP) (water ≦0.01%) was added to a total of 13.6 g of dry p(HEMA-co-MAA) from Example 1, which had been dried under vacuum for 12 hours at 100° C. The reaction flask with a magnetic stirrer was kept under a dry nitrogen atmosphere. A 2% solution of methacrylic acid anhydride 94% in anhydrous NMP (24.7 mL, 0,003 moles) was added drop wise over a 2–3 minute period. Triethylamine (0.45 mL, 0.003 moles) was added, and the flask content was then heated, while stirring, to 35° C. for 48 hours.

The temperature was decreased to 25° C. and 200 mL of deionised water was added. The crude reaction mixture was then poured into 400 mL aqueous HCl (0.1M pH=1.5). 4L of deionised water was added inducing instantaneous precipitation. After the precipitate had been rinsed with water, it was dissolved in 100 mL of ethanol. A second precipitation was made with 1 L of water and HCl (pH=1.5). The precipitate was soaked in an extra litre of water for several hours to remove any remaining acid. Finally the precipitate was dissolved in methanol to give a clear solution.

EXAMPLE 14

4.38 grams of an unfractionated HEMA-MAA copolymer was dried by evaporation at 125° C., 3 mm Hg for 24 hours and then dissolved in DMF (99+%, ≦0.1% $H_2O$) to give a 20% w/w solution. To obtain an esterification of approximately 3% of the copolymer's hydroxyl groups, 1.08 mmol of methacrylic anhydride (94% pure) was mixed with 8 mL DMF, and then added to the polymer solution. Triethylamine (1.08 mmol, ≧99.5% pure from Fluka) was subsequently added. The mixture was allowed to react for 20 hours at 30° C., after which the reaction was stopped by adding 2 mL of water. Glycerol (10 g) was added to the polymer solution before the DMF was distilled off (30° C., 0.5 mbar for 2 hours).

The functionalized copolymer was contacted with water to dissolve residual DMF and other low molecular weight materials. The water was decanted, and the washing repeated until there were no traces of DMF. The degree of functionalization was determined to be 2.2%, and Mpeak= 41 kD, and Pd=2.8. When molded into a hydrogel using the methods similar to Example 22 the following mechanical properties were found: Modulus: 11±2 psi. Elongation 120±25. The properties are relatively poor due to the high Pd.

EXAMPLES 15–20

Poly-HEMA prepared as in Example 1 (unfractionated) was functionalized using the method described in Example 13 (Examples 15 and 16). Poly-HEMA prepared as in Example 1 was fractionated using the method described in Example 10 and then functionalized using the method described in Example 13 (Examples 17 and 18). Lenses were made from the polymers from fractionated and un-fractionated functionalized poly-HEMA using the methods of Example 22 and 61% w/w tetraethylene glycol as the diluent. The viscous solutions were cured according to the methods of Example 22. The results are shown in Table 6, below.

TABLE 6

| | HEMA/MAA polymer | | Functionalized polymer | | Lens properties | |
| --- | --- | --- | --- | --- | --- | --- |
| | Mp | | | | Modulus | Elongation |
| Ex | kD | Pd | Mp | Pd | psi | % |
| 15 | 40 | 3.48 | 48 | 1.67 | 32 | 76 |
| 16 | 53 | 3.59 | 62 | 1.88 | 33 | 90 |
| 17 | 44 | 1.35 | 45 | 1.4 | 37 | 109 |
| 18 | 64 | 1.7 | 70 | 1.59 | 40 | 106 |

It can be seen that the method employed for functionalization can reduce the polydispersity to an acceptable value. Generally the washing step removes the smallest poly-HEMA molecules. The lens properties indicate that a functionalized polymers having lower polydispersities display better mechanical properties.

EXAMPLE 21

3.22 grams of a GMA-HEMA copolymer formed and isolated in Example 4 was dried by evaporation at 125° C., 3 mm Hg for 24 hours and then dissolved in DMF (99+%, ≦0.1% $H_2O$) 20% w/w solution. To obtain an average esterification of approximately 2.4 out of every 100 units, 0.74 mmol of methacrylic anhydride (94% pure from Fluka)

was mixed with 6 mL DMF, and then added to the polymeric solution. Triethylamine (0.74 mmol, ≧99.5% pure, from Fluka) was subsequently added to the polymer solution. The reaction mixture was allowed to react for 20 hours at 30° C., after which the reaction was stopped by adding 2 mL of water. 10 g of glycerol was added to the polymer solution before the DMF was distilled off (30° C., 0.5 mbar for 2 hours).

The functionalized copolymer was contacted with deionized water to dissolve residual DMF and other low molecular weight materials. Upon cooling below approximately 5° C., the functionalized polymer precipitated, and the aqueous phase was decanted. Methanol was added to dissolve the functionalized polymer. The degree of functionalization was found to be 2.3, which corresponds to 90% of the target value. The functionalized polymer was dissolved with tetraethylene glycol to make a molding solution containing 39% w/w solids using the method of Example 22. Lenses were made as described in Example 22. The resulting hydrogel lenses had the following mechanical properties (at equilibrium water content of 65%) Modulus 18±1 psi. Elongation 120±25%.

EXAMPLE 22

The solution of the HEMA-2%MAA copolymer from Example 13 was transferred through a 25 mm GD/X 0.45 mm Whatmann filter to a syringe and mixed with tetraethylene glycol (99+% pure, from Fluka) to give a molding solution containing 39% w/w dry prepolymer, 60.5% tetraethylene glycol and 0.5% w/w Darocur 1173 photoinitiator was added. The blend was mixed. By applying a controlled vacuum to the syringe, the low boiling solvents were removed. The cylinder was centrifuged to bring all the solution down into the outlet end. The barrel was inserted into the cylinder and pushed down until it was in contact with the molding solution while keeping a temporary passage for the air to escape. The syringe containing the molding solution was placed in a fixture where a controlled force was applied to the barrel and about 50 mg of the solution was dosed into the lower part of a contact lens mold made of polystyrene. The upper part of the mold was put in place and the mold was closed and the parts were held together for 5 seconds by application of a 10 kg load.

The closed mold was placed on a conveyor belt running 1 m/sec., and the mold passed under a high intensity UV lamp focused 20 mm above the conveyor for less than about 10 seconds. The maximum intensity was 5 W/cm$^2$, and the closed mold received 15 J/cm$^2$ total as detected in the UV-a range by a PowerPuck® UV-spectrophotometer placed next to the closed mold.

After curing the lid was removed by hand, and the lens was soaked for 10 minutes in deionized water. The resulting hydrogel lenses retained their shape as well as their dimensions when the tetraethylene glycol diluent was replaced with saline water. Thus a 1:1 copy of the mold surface was made. A 14.00 mm diameter mold gave a 14.00 mm diameter hydrogel lens.

EXAMPLE 23

Example 1 was repeated, except that the poly-HEMA solution was diluted with ethanol to give a 36% w/w solution in ethanol. The molecular weight and polydispersity of the resulting poly-HEMA are shown in Table 7, below.

EXAMPLE 24

Example 1 was repeated, except that the poly-HEMA solution was diluted with ethanol to give a 36% w/w solution in ethanol and octyl mercaptan was used as the chain transfer agent instead of dodecyl mercaptan. The resulting polymer solution was fractionated as described in Example 10. The molecular weight and polydispersity of the resulting poly-HEMA are shown in Table 7, below.

TABLE 7

| Ex # | Fractionated | Mw (kD) | Mp (kD) | Pd |
|------|--------------|---------|---------|------|
| 23   | No           | 67      | 48      | 2.56 |
| 24   | Ex 10        | 47      | 40      | 1.26 |

EXAMPLE 25–28

Example 3 was repeated except that the polymerization temperature (Examples 25–27) and solvent (Example 28) were varied as shown in Table 8, below. Example 27 was not fractionated. All other Examples in this set were fractionated according to Example 10. Molecular weight and polydispersity are shown in Table 8, below.

TABLE 8

| Ex # | T (° C.) | Solvent | Mw (kD) | Mp (kD) | Pd   |
|------|----------|---------|---------|---------|------|
| 25   | 72       | EOH     | 95      | 64      | 1.7  |
| 26   | 68       | EOH     | 94      | 70      | 1.56 |
| 27   | 75       | EOH     | 67      | 49      | 2.6  |
| 28   | 74       | IPA     | 52      | 45      | 1.39 |

EXAMPLES 29–37

The polymers of Examples 23 through 28 were functionalized using methods similar to Example 13, with the changes noted in Table 9, below. The percent functionalization, molecular weight and polydispersities are listed in Table 9.

TABLE 9

| Ex # | Prepol Ex. # | % F target | % F actual | Solvent | base | Acyl. agent | Mw (kD) | Mp (kD) | Pd   |
|------|--------------|------------|------------|---------|------|-------------|---------|---------|------|
| 29   | 23           | 10         | 2.3        | DMSO    | Py   | MAACl       | 83      | 56      | 2.18 |
| 30   | 26           | 8          | 2.2        | NMP     | TEA  | MAACl       | 89      | 67      | 1.42 |
| 31   | 28           | 6          | 2.9        | NMP     | DMAP | MAAH        | 56      | 48      | 1.21 |
| 32   | 28           | 3.4        | 2.1        | NMP     | TEA* | MAACl       | 63      | 48      | 1.30 |
| 33   | 25           | 3          | 1.4        | NMP     | Py   | MAAH        | 89      | 68      | 1.43 |
| 34   | 27           | 10         | 2.2        | NMP     | DABCO| MAACl       | 82      | 55      | 1.79 |
| 35   | 26           | 3.3        | 2.9        | NMP     | TEA  | MAAH        | 81      | 111     | 1.61 |

TABLE 9-continued

| Ex # | Prepol Ex. # | % F target | % F actual | Solvent | base | Acyl. agent | Mw (kD) | Mp (kD) | Pd |
|---|---|---|---|---|---|---|---|---|---|
| 36 | 26 | 3 | 2.2 | NMP | TEA | MAAH | 84 | 114 | 1.66 |
| 37 | 24 | 3 | 2.4 | NMP | TEA | MAAH | 43 | 50 | 1.25 | conducted at 57° C.

EXAMPLE 38–41

The functionalized prepolymers made in Examples 33 and 35 through 37 were molded into lenses according to Example 22. The modulus, elongation and equilibrium water content are shown in Table 10, below.

TABLE 10

| Ex. # | Funct. PP Ex. # | Modulus (psi) | Elong. (%) | % H$_2$O |
|---|---|---|---|---|
| 38 | 33 | 4 | 462 | 62 |
| 39 | 35 | 50 | 107 | 58 |
| 40 | 36 | 20 | 150 | 59 |
| 41 | 37 | 25 | 160 | 59 |

EXAMPLE 42

Into a syringe, a polymer solution containing 19.5% w/w of the prepolymer from Example 33 and 19.5% w/w of the prepolymer from Example 35 were mixed with TEG (99+% pure, from Fluka) and the photo-initiator Darocur 1173. Upon evaporation of the alcohol, the viscous solution contained Darocur 1173 equal to 0.5% w/w, 60.5% w/w TEG, and 19.5% w/w of each of the prepolymers. Hydrogels made of this molding solution and cured as in Example 22 showed the following mechanical properties: Modulus: 27±2 psi. Elongation 186±14%.

EXAMPLE 43

Into a syringe, a solution of the functionalized prepolymer from Example 30 was mixed with tetraethylene glycol (99+% pure, from Fluka) and the photo-initiator Darocur 1173. Upon evaporation of low boiling solvents, the viscous solution contained Darocur 1173 equal to 0.5% w/w, 50% w/w tetraethylene glycol, and 49.5% w/w of the functionalized prepolymer from Example 30. Degassed water was added to give a viscous solution that contained Darocur 1173 equal to 0.4% w/w, 39% w/w tetraethylene glycol, and 38.6% w/w of a prepolymer and 22% water as co-diluent. Hydrogels made of this molding solution were cured as in Example 22 and gave the following mechanical properties: modulus of 34±7 psi and elongation of 136±20%.

EXAMPLE 45

The bottom fraction (described in Table 2) of the prepolymer in Example 1 rich in the high molecular weight polymer fraction was functionalized using the methods described in Example 9. The functionalized and washed prepolymer was then mixed with TEG using the methods described in Example 22 to give a viscous solution containing 50% solids. The relaxation time of this viscous solution was found to be 400 seconds at 20° C.

About 50 mg of this solution was molded into a contact lens according to Example 22 using hold times of 200, 400 and 800 seconds at 20° C.

After curing the lids were removed by hand, and the lenses were soaked for 10 minutes in deionized water. The lenses prepared using hold times of 200 seconds and 400 seconds were distorted and had a shape that deviated from the mold cavity. The lenses prepared using hold times of 800 seconds maintained the spherical shape of the mold and were free from distortion.

What is claimed is:

1. A composition comprising poly-HEMA having a peak molecular weight about 25,000 with a polydispersity of less than about 2 to a peak molecular weight of about 100,000 with a polydispersity of less than about 3.8.

2. The composition of claim 1 wherein said peak molecular weight is between about 30,000 with a polydispersity of less than about 2 and about 90,000 with a polydispersity of less than about 3.5.

3. The composition of claim 1 wherein said peak molecular weight is between about 30,000 with a polydispersity of less than about 2 and about 80,000 with a polydispersity of less than about 3.2.

4. The composition of claim 1 wherein said peak molecular weight is between about 25,000 with a polydispersity of less than about 1.5 and about 80,000 with a polydispersity of less than about 3.5.

5. The composition of claim 1 wherein said peak molecular weight is below about and 100,000 and said polydispersity is less than about 2.

6. The composition of claim 5 wherein said polydispersity is less than about 1.7.

7. The composition of claim 5 wherein said polydispersity is less than about 1.5.

8. The composition of claim 1 wherein said poly-HEMA is substantially free from gel particles.

9. The composition of claim 1 wherein said poly-HEMA is a copolymer comprising HEMA and at least one comonomer.

10. The composition of claim 9 wherein said comonomer comprises at least one hydrophilic monomer.

11. The composition of claim 10 wherein said at least one hydrophilic monomer is selected from vinyl-containing monomers.

12. The composition of claim 11 wherein said at least one vinyl containing monomer is selected from the group consisting of N,N-dimethyl acrylamide, glycerol methacrylate, 2-hydroxyethyl methacrylamide, polyethyleneglycol monomethacrylate, methacrylic acid, acrylic acid, N-vinyl lactams, N-vinyl-N-methyl acetamide, N-vinyl-N-ethyl acetamide, N-vinyl-N-ethyl formamide, N-vinyl formamide, vinyl carbonate monomers, vinyl carbamate monomers, oxazolone monomers and mixtures thereof.

13. The composition of claim 10 wherein said at least one hydrophilic monomer is selected from the group consisting of N,N-dimethyl-acrylamide, glycerol methacrylate, 2-hydroxyethyl methacrylamide, N-vinylpyrrolidone, polyethyleneglycol monomethacrylate, methacrylic acid and acrylic acid and mixtures thereof.

14. The composition of claim 10 wherein said at least one hydrophilic monomer comprises N,N-dimethyl acrylamide, methacrylic acid and glycerol methacrylate.

15. The composition of claim 10 wherein said at least one hydrophilic monomer is present in an amount less than about 50 weight %.

16. The composition of claim 10 wherein said at least one hydrophilic monomer is present in an amount between about 0.5 and 40 weight %.

17. The composition of claim 10 wherein said hydrophilic monomer comprises glycerol methacrylate in amounts up to about 50 weight %.

18. The composition of claim 10 wherein said hydrophilic monomer comprises glycerol methacrylate in amounts between about 25 and about 45 weight %.

19. The composition of claim 10 wherein said hydrophilic monomer comprises methacrylic acid in amounts less than about 5 weight %.

20. The composition of claim 10 wherein said hydrophilic monomer comprises methacrylic acid in amounts between about 0.5 and about 5.0 weight %.

21. The composition of claim 10 wherein said hydrophilic monomer comprises N,N-dimethyl acrylamide in amounts up to about 50 weight %.

22. The composition of claim 10 wherein said hydrophilic monomer comprises N,N-dimethyl acrylamide in amounts between about 10 and about 40 weight %.

23. The composition of claim 1 wherein said poly-HEMA a homopolymer.

24. The composition of claim 9 wherein said copolymer comprises at least one hydrophobic monomer.

25. The composition of claim 24 wherein said hydrophobic monomer comprises at least one silicone-containing monomers or macromer having at least one polymerizable vinyl group.

26. The composition of claim 25 wherein said polymerizable vinyl group comprises 2-methacryloxy.

* * * * *